US011522453B2

(12) United States Patent
Pao et al.

(10) Patent No.: US 11,522,453 B2
(45) Date of Patent: Dec. 6, 2022

(54) DEAD-TIME CONDUCTION LOSS REDUCTION FOR BUCK POWER CONVERTERS

(71) Applicant: Taiwan Semiconductor Manufacturing Co., Ltd., Hsin-Chu (TW)

(72) Inventors: Chia-Cheng Pao, Hsinchu (TW); Chu Fu Chen, Zhubei (TW); Chih-Hua Wang, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 246 days.

(21) Appl. No.: 16/837,489

(22) Filed: Apr. 1, 2020

(65) Prior Publication Data

US 2020/0235668 A1    Jul. 23, 2020

Related U.S. Application Data

(63) Continuation of application No. 16/372,823, filed on Apr. 2, 2019, now Pat. No. 10,644,601.

(Continued)

(51) Int. Cl.
| H02M 3/158 | (2006.01) |
| H02M 1/08 | (2006.01) |
| H02M 1/00 | (2006.01) |

(52) U.S. Cl.
CPC .............. *H02M 3/158* (2013.01); *H02M 1/08* (2013.01); *H02M 1/0038* (2021.05); *H02M 3/1582* (2013.01)

(58) Field of Classification Search
CPC ........ H02M 3/158; H02M 3/156; H02M 1/08; H02M 1/38; H02M 1/0038; H02M 1/0051; H02M 1/088
See application file for complete search history.

(56) References Cited

U.S. PATENT DOCUMENTS

| 4,327,320 A | * | 4/1982 | Oguey | .................... G05F 3/247 257/E27.06 |
| 5,744,994 A | * | 4/1998 | Williams | ............ H01L 27/0248 327/427 |

(Continued)

FOREIGN PATENT DOCUMENTS

CN    107863878 A    8/2018

OTHER PUBLICATIONS

W. Yan, C. Pi, W. Li, and R. Liu, "Dynamic dead-time controller for synchronous buck DC-DC converters," Electronics Letters, vol. 46, pp. 164-165, Jan. 2010.

(Continued)

*Primary Examiner* — Gustavo A Rosario-Benitez
(74) *Attorney, Agent, or Firm* — Eschweiler & Potashnik, LLC

(57) ABSTRACT

Various embodiments of the present application are directed towards an integrated circuit (IC) including a first switching device, a second switching device, an inductor, and a controller. The inductor is electrically coupled to a first source/drain region of the first switching device and a first source/drain region of the second switching device at a node. The controller is configured to alternatingly change the first and second switching devices between a first state and a second state, respectively. The first switching device is in a third state before or after the second switching device transitions between the first and second states. A subthreshold voltage is applied to a first gate of the first switching device during the third state, such that the third state is between a cutoff mode and a triode mode of the first switching device.

20 Claims, 8 Drawing Sheets

Related U.S. Application Data

(60) Provisional application No. 62/688,539, filed on Jun. 22, 2018.

(56) References Cited

U.S. PATENT DOCUMENTS

| | | | |
|---|---|---|---|
| 6,429,628 B2 | 8/2002 | Nakagawa et al. | |
| 7,446,513 B2* | 11/2008 | Dikken | H02M 1/38 323/271 |
| 7,777,468 B2* | 8/2010 | Okuda | H02M 3/1588 323/282 |
| 9,203,313 B2* | 12/2015 | Abe | H02M 1/32 |
| 11,152,848 B2* | 10/2021 | Li | H02M 1/08 |
| 2004/0017111 A1* | 1/2004 | May | H02M 3/158 307/31 |
| 2004/0070377 A1 | 4/2004 | Bai et al. | |
| 2005/0075679 A1* | 4/2005 | Gliner | A61N 1/36082 607/45 |
| 2007/0230228 A1 | 10/2007 | Mao | |
| 2008/0211467 A1* | 9/2008 | Huang | H02M 3/1588 323/271 |
| 2011/0101949 A1* | 5/2011 | Lopata | H02M 3/1588 323/286 |
| 2011/0148377 A1 | 6/2011 | Schiff et al. | |
| 2012/0025794 A1* | 2/2012 | Inoue | H02M 3/158 323/271 |
| 2012/0074924 A1 | 3/2012 | Dequina et al. | |
| 2017/0279354 A1 | 9/2017 | Lueders et al. | |
| 2018/0159528 A1 | 6/2018 | Prechtl et al. | |
| 2018/0159529 A1 | 6/2018 | Reusch et al. | |
| 2019/0036450 A1* | 1/2019 | Szczeszynski | H02M 3/073 |
| 2019/0252998 A1* | 8/2019 | Sakamoto | H02J 50/001 |
| 2019/0393785 A1* | 12/2019 | Pao | H02M 1/08 |

OTHER PUBLICATIONS

H.-W. Huang, K.-H. Chen, and S.-Y. Kuo, "Dithering Skip Modulation, Width and Dead Time Controllers in Highly Efficient DC-DC Converters for System-On-Chip Applications," IEEE J. Solid-State Circuits, vol. 42, pp. 2451-2465, Nov. 2007.

A. Zhao, A. A. Fomani, and W. T. Ng, "One-step digital dead-time correction for DC-DC converters," in Proc. IEEE Applied Power Electronics Conference and Exposition, 2010, pp. 132-137.

Lima et al. "Dead-Time Control System for a Synchronous Buck DC-DC Converter." IEEE 2007 International Conference on Power Engineering, Energy and Electrical Drives. Published Nov. 12, 2007.

Non-Final Office Action dated Aug. 21, 2019 for U.S. Appl. No. 16/372,823.

Notice of Allowance dated Jan. 2, 2020 for U.S. Appl. No. 16/372,823.

* cited by examiner

DEAD-TIME CONDUCTION LOSS REDUCTION FOR BUCK POWER CONVERTERS

REFERENCE TO RELATED APPLICATIONS

This application is a Continuation of U.S. application Ser. No. 16/372,823, filed on Apr. 2, 2019, which claims the benefit of U.S. Provisional Application No. 62/688,539, filed on Jun. 22, 2018. The contents of the above-referenced patent applications are hereby incorporated by reference in their entirety.

BACKGROUND

A buck converter is a DC-to-DC power converter which steps down voltage (while stepping up current) from its input to its output. A buck converter is a type of switching converter comprising at least two semiconductor devices and at least one energy storage element. For example, a buck converter may comprise two transistors and an inductor. Switching converters are highly efficient, especially compared to linear regulators, such that switching converters are commonly used within integrated circuits.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
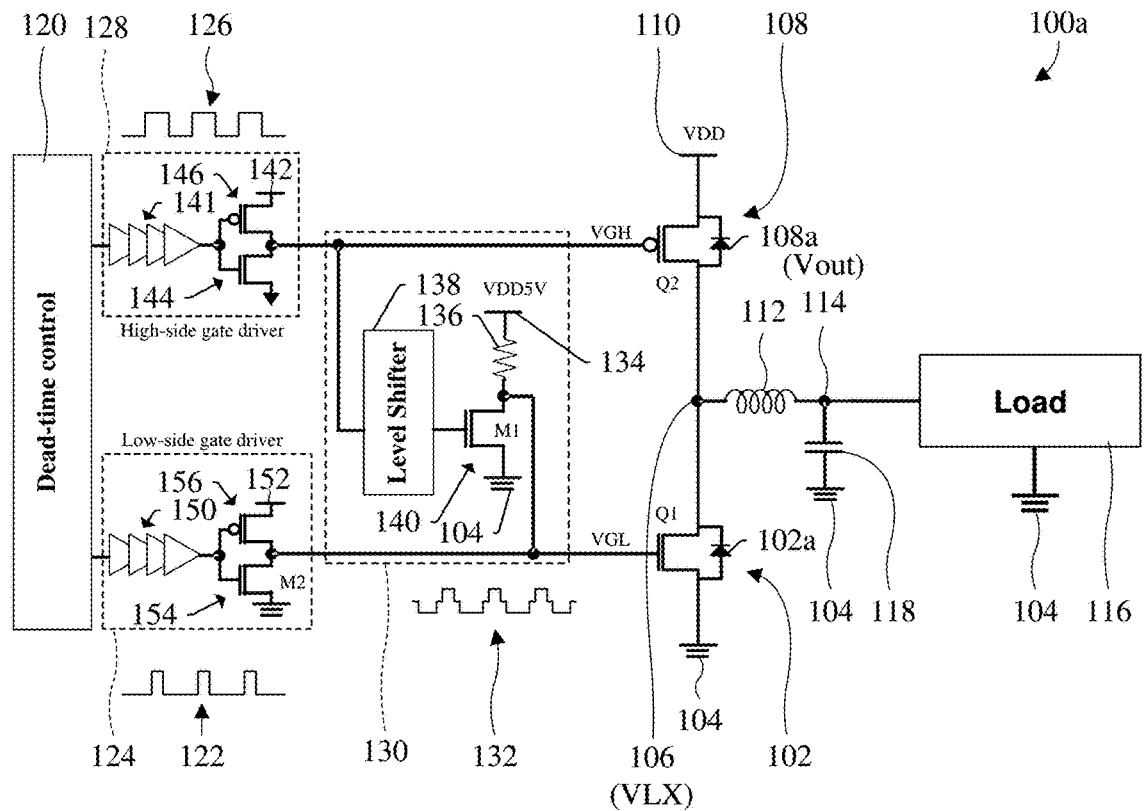
FIG. 1A illustrates a circuit diagram of some embodiments of a buck converter circuit comprising a conduction-loss reduction circuit.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A buck converter may comprise a p-type metal-oxide-semiconductor field-effect transistors (MOSFET) and an n-type MOSFET electrically coupled to an inductor at a first node. The n-type MOSFET is gated by a first input signal supplied by a low-side gate driver of a control circuit. The p-type MOSFET is gated by a second input signal supplied by a high-side gate driver of the control circuit. A source of the p-type MOSFET is electrically coupled to a power supply of a first voltage domain and a source of the n-type MOSFET is electrically coupled to a reference node (e.g. ground). The control circuit supplies the first and second input signals to alternatingly change the p-type and n-type MOSFETs between ON and OFF. The p-type MOSFET is OFF while the n-type MOSFET is ON, thereby defining a first state. The p-type MOSFET is ON while the n-type MOSFET is OFF, thereby defining a second state. Depending upon which one of the n-type and p-type MOSFETs is in the ON state, the inductor is either charging or discharging. A dead-time period occurs immediately before and after a transition from the first state to the second state or vice versa. The control circuit ensures the n-type and p-type MOSFETs are both OFF during the dead-time period. The dead-time period ensures the power supply does not short to ground while transitioning between the first and second states. Challenges with the buck converter are in conduction power losses during the dead-time period.

During dead-time periods a body diode in the n-type MOSFET is forward biased, whereby current flows through the body diode. Current flowing through the body diode will trigger parasitic NPN power losses within a substrate between a power supply terminal and a drain of the N-type MOSFET. Therefore, an approach for overcoming the conduction power loss may be to reduce the elapsed time the buck converter remains in the dead-time period. Reducing the elapsed time in the dead-time period will result in less power loss because current will spend less time flowing through the body diode. However, reducing the elapsed time too much could result in a failure to protect the power supply from shorting to the reference node while transitioning between the first and second states.

Various embodiments of the present application are directed towards a buck converter comprising a conduction-loss prevention circuit configured to reduce the voltage of the body diode of the n-type MOSFET. In some embodiments, the conduction-loss prevention circuit comprises a transistor, a pullup resistor, and a level shifter. A first source/drain region of the transistor is electrically coupled to the reference node, and a second source/drain region is electrically coupled to a gate terminal of the n-type MOSFET. The pullup resistor is electrically coupled from a second power supply of a second voltage domain to the gate terminal of the n-type MOSFET. The level shifter is electrically coupled from a gate terminal of the p-type MOSFET to a gate terminal of the transistor. The conduction-loss prevention circuit is configured to bias the gate terminal of the n-type MOSFET with a voltage less than a threshold voltage of the n-type MOSFET during the dead-time period. A weak-inversion current flows through a conductive channel formed within the n-type MOSFET. The weak-inversion current is in parallel with current flowing through the body diode effectively lowering the voltage of the body diode and reducing conduction power loss within the buck converter.

With reference to FIG. 1A, a circuit diagram 100a of some embodiments of a buck converter circuit is provided. A first switching device 102 (e.g., Q1) has a first source/drain terminal electrically coupled to a reference node 104 (e.g., ground), and further has a second source/drain terminal electrically coupled to a first node 106 (e.g., VLX). In some embodiments, the first switching device 102 comprises a first intrinsic body diode 102a electrically coupled between the first and second source/drain terminals. A second switching device 108 (e.g., Q2) has a third source/drain terminal electrically coupled to the first node 106, and further has a fourth source/drain terminal electrically coupled to a power supply 110 (e.g., VDD). In some embodiments, the second switching device 108 comprises a second intrinsic diode 108a electrically coupled between the third and fourth source/drain terminals. The first and second switching devices 102, 108 may, for example, be metal-oxide-semiconductor field-effect transistors (MOSFETs), some other suitable metal-oxide-semiconductor (MOS) devices, or some other suitable insulated-gate field-effect-transistors (IGFETs). In some embodiments, the first switching device 102 is an n-channel MOS device and the second switching device 108 is a p-channel MOS device. In some embodiments, the first switching device 102 is a p-channel MOS device and the second switching device 108 is an n-channel MOS device. The power supply 110 may, for example, be a direct current (DC) voltage supply and/or may, for example, apply 5 volts, 6 volts, 12 volts, or some other suitable voltage to the fourth source/drain terminal of the second switching device 108.

An inductor 112 is electrically coupled from the first node 106 to a second node 114 (e.g., Vout), and a load 116 is electrically coupled from the second node 114 to the reference node 104. In some embodiments, a capacitor 118 is also electrically coupled from the second node 114 to the reference node 104. During use of the buck converter circuit, the inductor 112 charges while the second switching device 108 is in an ON state and discharges while the second switching device 108 is in an OFF state. Similarly, the capacitor 118 charges while the second switching device 108 is in an ON state and discharges while the second switching device 108 is in an OFF state.

A controller 120 (e.g., dead-time control) is configured to generate a first pulse wave (or train) 122 (e.g., VGL) that is provided to a gate of the first switching device 102. In some embodiments, the first pulse wave 122 is provided to the gate of the first switching device 102 via a low side gate driver circuit 124. The first pulse wave 122 causes the first switching device 102 to alternatingly switch between the ON state and the OFF state. For example, where the first switching device 102 is an n-channel MOS device, the first switching device 102 may be in the ON state at each pulse and may be in the OFF state between pulses. Additionally, the controller 120 is configured to generate a second pulse wave (or train) 126 (e.g., VGH) that is provided to a gate of the second switching device 108. In some embodiments, the second pulse wave 126 is provided to the gate of the second switching device 108 via a high side gate driver circuit 128. The second pulse wave 126 causes the second switching device 108 to alternatingly switch between the ON state and the OFF state. For example, where the second switching device 108 is a p-channel MOS device, the second switching device 108 may be in the OFF state at each pulse and may be in the ON state between pulses. In some embodiments, a duty cycle of the second pulse wave 126 is greater than that of the first pulse wave 122, the second pulse wave 126 has a phase offset relative to the first pulse wave 122, a frequency of the second pulse wave 126 is the same as that of the first pulse wave 122, or any combination of the foregoing.

The high side gate driver circuit 128 comprises a plurality of filters 141, a high side power supply 142, a first transistor 144, and a second transistor 146. The plurality of filters 141 are electrically coupled between a first output of the controller 120 and gate terminals of the first and second transistors 144, 146. A first source/drain terminal of the first transistor 144 is electrically coupled to the gate of the second switching device 108. A first source/drain terminal of the second transistor 146 is electrically coupled to the high side power supply 142 and a second source/drain terminal of the second transistor 146 is electrically coupled to the gate of the second switching device 108. In some embodiments, the first transistor 144 is an n-type MOS device and the second transistor 146 is a p-type MOS device or vice versa.

The low side gate driver circuit 124 comprises a second plurality of filters 150, a low side power supply 152, a third transistor 154 (e.g., M2), and a fourth transistor 156. The second plurality of filters 150 are electrically coupled between a second output of the controller 120 and gate terminals of the third and fourth transistors 154, 156. A first source/drain terminal of the third transistor 154 is electrically coupled to the gate of the first switching device 102. A first source/drain terminal of the fourth transistor 156 is electrically coupled to a low side power supply 152 and a second source/drain terminal of the fourth transistor 156 is electrically coupled to the gate of the first switching device 102. In some embodiments, the third transistor 154 is an n-type MOS device and the fourth transistor 156 is a p-type MOS device or vice versa.

In some embodiments, the high side power supply 142 supplies a high voltage relative to the low side power supply 152. For example, in some embodiments, the high side power supply 142 may supply 20 volts or more, whereas the low side power supply 152 may supply 5 volts or less. Other voltages are, however, amenable. Further, in some embodiments, the high side power supply 142 and the power supply 110 are one in the same. The high side power supply 142 and the low side power supply 152 may, for example, be DC power supplies or some other suitable power supplies.

The first and second pulse waves 122, 126 are generated so the first and second switching devices 102, 108 are not ON at the same time. To have the first and second switching devices 102, 108 ON at the same time would electrically short the power supply 110 to the reference node 104, which could damage and/or destroy the power supply 110. So the first and second switching devices 102, 108 are not on at the same time, the first and second pulse waves 122, 126 coordinate so there are dead-time (or transient) periods immediately before and immediately after each pulse of the first pulse wave 122. During the dead-time periods, the first and second pulse waves 122, 126 are generated so first and second switching devices 102, 108 are OFF.

In some embodiments in which the first switching device 102 is an n-channel MOS device and the second switching device 108 is a p-channel MOS device, the dead-time periods arise by: 1) generating the first and second pulse waves 122, 126 with the same frequency; 2) generating the second pulse wave 126 with a larger duty cycle than the first pulse wave 122; and 3) introducing a phase offset into the first or second pulse wave 122, 126 so each pulse of the first pulse wave 122 is centered on or about centered on a corresponding pulse of the second pulse wave 126. In these embodiments, dead-time periods arise where the second pulse wave 126 is high and the first pulse wave 122 is low. For example, a dead-time period may occur immediately before the second pulse wave 126 transitions from high to low (i.e., immediately before a falling edge of the second pulse wave 126). As another example, a dead-time period may occur immediately after the second pulse wave 126 transitions from low to high (i.e., immediately after a rising edge of the second pulse wave 126).

If the first and second switching devices 102, 108 are both fully OFF during the dead-time periods, conduction power loss may occur due to current from the inductor 112 traveling to the reference node 104 through the first intrinsic body diode 102a of the first switching device 102. The current flowing through the first intrinsic body diode 102a of the first switching device 102 triggers additional conduction power loss through an NPN junction (not shown) within a substrate (not shown) between the power supply 110 and the first node 106. A conduction-loss reduction circuit 130 (e.g., loss-prevention circuit) is electrically coupled to the gate of the first switching device 102 to reduce or eliminate the conduction power loss.

The conduction-loss reduction circuit 130 comprises a second power supply 134 (e.g., VDD5V), a resistor 136, a level shifter 138, and a fifth transistor 140 (e.g., M1). The resistor 136 is electrically coupled between the second power supply 134 and the gate of the first switching device 102. The fifth transistor 140 has a fifth source/drain terminal electrically coupled to the reference node 104, a sixth source/drain terminal electrically coupled to the gate of the first switching device 102, and a gate terminal electrically coupled to the level shifter 138. The level shifter 138 is electrically coupled between the gate of the second switching device 108 and the gate of the fifth transistor 140. The second power supply 134 may, for example, be a direct current (DC) voltage supply and/or may, for example, apply 5 volts, 6 volts, 12 volts, or some other suitable voltage to the resistor 136. The fifth transistor 140 may, for example, be a MOSFET, some other suitable MOS device, or some other suitable IGFET. In some embodiments, the fifth transistor 140 is an n-channel MOS device or a p-channel MOS device. In some embodiments, the low side power supply 152 and the second power supply 134 are one in the same, and/or the second power supply 134 supplies a voltage less than that of the power supply 110.

The conduction-loss reduction circuit 130 monitors for the dead-time periods and, during the dead-time periods, biases the gate of the first switching device 102 so the first switching device 102 is partially ON. In some embodiments, the bias applied to the gate of the first switching device 102 can be tuned by a resistive value of the resistor 136, a voltage value across the fifth transistor 140 (e.g., M1) while operating in an ON state, a voltage value across the third transistor 154 (e.g., M2) while operating in an ON state, or any combination of the foregoing. By partially ON, it is meant that the gate of the first switching device 102 is biased with a voltage less than a threshold voltage of the first switching device 102. As a result, the gate of the first switching device 102 is driven by a stepped pulse wave 132 (e.g., VGL) that is the combination of the first pulse wave 122 and the biasing from the conduction-loss reduction circuit 130. By changing the first switching device 102 to partially ON during the dead-time periods, current from the inductor 112 can travel to the reference node 104 through both the first intrinsic body diode 102a of the first switching device 102 and a selectively-conductive channel of the first switching device 102. This has the effect of reducing conduction power loss. For example, the two parallel paths may reduce the overall resistance from the inductor 112 to the reference node 104, which may reduce the forward bias of the first intrinsic body diode 102a and hence the power loss. Additionally, because the first switching device 102 is only partially ON, the power supply 110 is not subject to damage from being electrically shorted to the reference node 104.

Figure 1B:
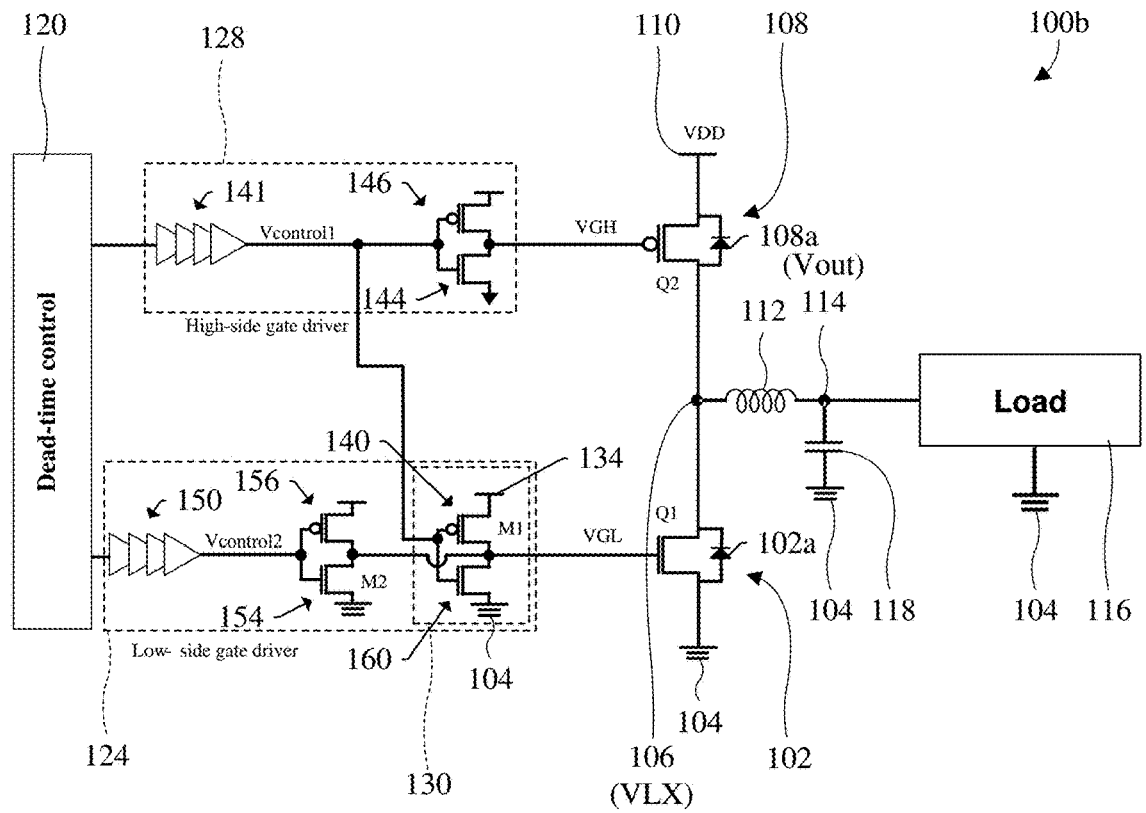
FIG. 1B illustrates a circuit diagram of various alternative embodiments of the circuit diagram of FIG. 1A.

With reference to FIG. 1B, a circuit diagram 100b of some alternative embodiments of the circuit diagram of FIG. 1A is provided in which the level shifter 138 is omitted and the conduction-loss reduction circuit 130 comprises a sixth transistor 160 in place of the resistor 136. A first source/drain terminal of the sixth transistor 160 is electrically coupled to the reference node 104, and a second source/drain terminal of the sixth transistor 160 is electrically coupled to the gate of the first switching device 102. A first source/drain terminal of the fifth transistor 140 is electrically coupled to the second power supply 134 and a second source/drain terminal of the fifth transistor 140 is electrically coupled to the gate of the first switching device 102. Gate terminals of the fifth and sixth transistors 140, 160 are electrically coupled between the plurality of filters 141 and the gate terminals of the first and second transistors 144, 146. In some embodiments, the fifth transistor 140 is a p-type MOS device and the sixth transistor 160 is an n-type MOS device or vice versa. A first control signal Vcontrol1 is defined between the plurality of filters 141 and the gate terminals of the first and second transistors 144, 146. A second control signal Vcontrol2 is defined between the second plurality of filters 150 and the gate terminals of the third and fourth transistors 154, 156.

Figure 2:
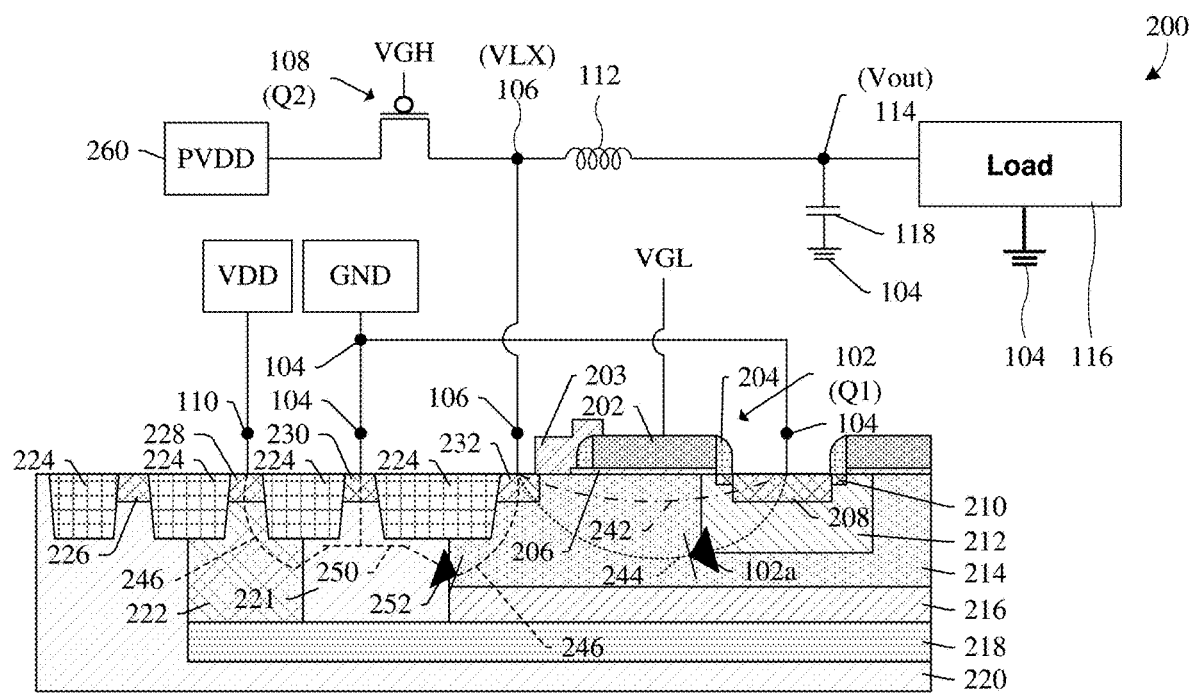
FIG. 2 illustrates a cross-sectional view of some embodiments of a buck converter circuit comprising the conduction-loss reduction circuit.

With reference to FIG. 2, a cross-sectional view 200 of some embodiments of a buck converter circuit is provided. In some embodiments, the cross-sectional view 200 represents an additional embodiment of the circuit 100a from FIG. 1A. Connections are shown between a substrate 220 and terminals and/or nodes. While not shown, connections between the substrate 220 and terminals and/or nodes may, for example, be achieved by a back-end-of-line (BEOL) interconnect structure overlying the substrate 220. The substrate 220 may be, for example, a bulk substrate (e.g., a bulk silicon substrate), a silicon-on-insulator (SOI) substrate, or some other suitable substrate. In some embodiments, the substrate 220 is P-type or N-type.

An N-buried layer (NBL) 218 is formed within the substrate 220 directly below a deep P-well (DPW) 216, a shallow N-well (SHN) 222, and a shallow P-well (SHP) 221. An N-type drain drift (NDD) 214 is formed directly above the DPW 216. An isolation structure 224 extends into an upper or top surface of the substrate 220 to provide electrical isolation between source/drain and contact regions within the substrate 220. In some embodiments, the isolation structure 224 includes multiple segments, each comprising a dielectric material, and/or is a shallow trench isolation (STI)

structure, a deep trench isolation structure (DTI), or some other suitable isolation structure.

A first contact region 226 comprises a P-type dopant and has a high doping concentration relative to the substrate 220. The first contact region 226 provides electrical coupling to the substrate 220, and the substrate 220 comprises a P-type dopant. A second contact region 228 (e.g., an NBL pickup ring) comprises an N-type dopant and has a high doping concentration relative to the SHN 222. The second contact region 228 provides electrical coupling to the SHN 222 and the NBL 218. The second contact region 228 is electrically coupled to the power supply 110. A third contact region 230 (e.g., a reference or ground pickup ring) comprises a P-type dopant and has a high doping concentration relative to the SHP 221. The third contact region 230 provides electrical coupling to the SHP 221. The third contact region 230 is electrically coupled to the reference node 104.

The first switching device 102 comprises a gate electrode 202, gate dielectric 206, a first source/drain region 232, a second source/drain region 208, a high voltage P-type implanted (HVPB) region 212, the NDD 214, and a sidewall spacer 204. The gate electrode 202 overlies the gate dielectric 206 and is electrically coupled to the low side gate driver (124 of FIG. 1A) and the conduction-loss reduction circuit (130 of FIG. 1A), such that the first pulse train (e.g., VGL) is applied to the gate electrode 202. The sidewall spacer 204 comprises two segments, such that the gate electrode 202 is sandwiched between the two segments. A resist protection oxide layer 203 is disposed over one of the two segments of the sidewall spacer 204, a portion of the gate electrode 202, and a portion of the gate dielectric 206. The second source/drain region 208 is disposed on a first side of the gate electrode 202 and is sandwiched between two lightly doped N-type regions 210. The second source/drain region 208 comprises an N-type dopant and has a high doping concentration relative to the lightly doped N-type regions 210. The second source/drain region 208 adjoins the HVPB region 212. The second source/drain region 208 is electrically coupled to the reference node 104. The first source/drain region 232 is disposed on a second side of the gate electrode 202 and directly contacts a segment of the isolation structure 224. The first source/drain region 232 is laterally offset from the second side of the gate electrode 202. The first source/drain region 232 comprises an N-type dopant and has a higher doping concentration than the NDD 214. The first source/drain region 232 provides electrical coupling to the NDD 214. The first source/drain region 232 is electrically coupled to the first node 106.

The third source/drain terminal of the second switching device 108 is electrically coupled to the first node 106, and further the fourth source/drain terminal of the second switching device 108 is electrically coupled to a third power supply 260 (e.g., PVDD). In some embodiments, the power supply 110 and the third power supply 260 are one in the same. The low side gate driver circuit (124 of FIG. 1A) and the conduction-loss reduction circuit (130 of FIG. 1A) are electrically coupled to a gate electrode of the second switching device 108, such that the first pulse wave (e.g., VGH) is applied to the gate electrode of the second switching device 108.

A first internal NPN junction exists between the SHN 222, SHP 221, and NDD 214. Under certain operating conditions, the first internal NPN junction functions as an NPN transistor 250 where a first current path 246 exists between the second contact region 228 and the first source/drain region 232 along the NPN transistor 250. The second contact region 228 and SHN 222 act as a collector of the NPN transistor 250, the third contact region 230 and SHP 221 act as a base of the NPN transistor 250, and the first source/drain region 232 and NDD 214 act as an emitter of the NPN transistor 250. An internal diode 252 of the NPN transistor 250 exists between the SHP 221 and the NDD 214 directing current flow towards the NDD 214. When a voltage at the emitter of the NPN transistor 250 is less than a voltage at the base of the NPN transistor 250 and a voltage at the collector of the NPN transistor 250 is greater than the voltage at the emitter and base of the NPN transistor 250, the NPN transistor 250 is ON and current will conduct across the first current path 246. It can be appreciated that the NPN transistor 250 is drawn in for convenience, the actual NPN junction is functioning as the NPN transistor 250 and current flow does not necessarily follow the path of the illustrated NPN transistor 250.

The first intrinsic body diode 102a of the first switching device 102 is located between the HVPB region 212 and the NDD 214 below the second source/drain region 208. Under certain operating conditions, the first intrinsic body diode 102a is forward biased and current flows along a second current path 244 from the second source/drain region 208 to the first source/drain region 232. Under certain operating conditions such as during a triode mode or a subthreshold mode the first switching device 102 is respectively ON or partially ON, current flows along a third current path 242 between the second source/drain region 208 and the first source/drain region 232. In some embodiments, the third current path 242 represents a conductive channel formed between the second source/drain region 208 and the first source/drain region 232. In some embodiments, the second current path 244 and the third current path 242 are in parallel when the first switching device 102 is partially ON and the second switching device 108 is OFF. The parallel path between the second and third current paths 244, 242 has the effect of reducing conduction power loss.

During operation of the first switching device 102, when a voltage value above a threshold voltage of the first switching device 102 is applied to the gate electrode 202, then the first switching device 102 is operating in the triode mode and is considered turned ON, a conductive channel forms within the HVPB region 212 allowing majority carriers (e.g., electrons) to flow from the second source/drain region 208 to the first source/drain region 232 along the third current path 242. If the voltage value applied to the gate electrode 202 is less than the threshold voltage of the first switching device 102, then the first switching device 102 is operating in the partially ON mode, the subthreshold mode, or a weak-inversion mode, a small conductive channel will form within the HVPB region 212 allowing majority carries (e.g., electrons) to flow from the second source/drain region 208 to the first source/drain region 232 along the third current path 242. The current flow across the small conductive channel will increase as the voltage value increases to the threshold voltage. However, when operating in the weak inversion-mode, the small conductive channel allows the flow of less current than the conductive channel formed in the triode mode.

Figure 3:
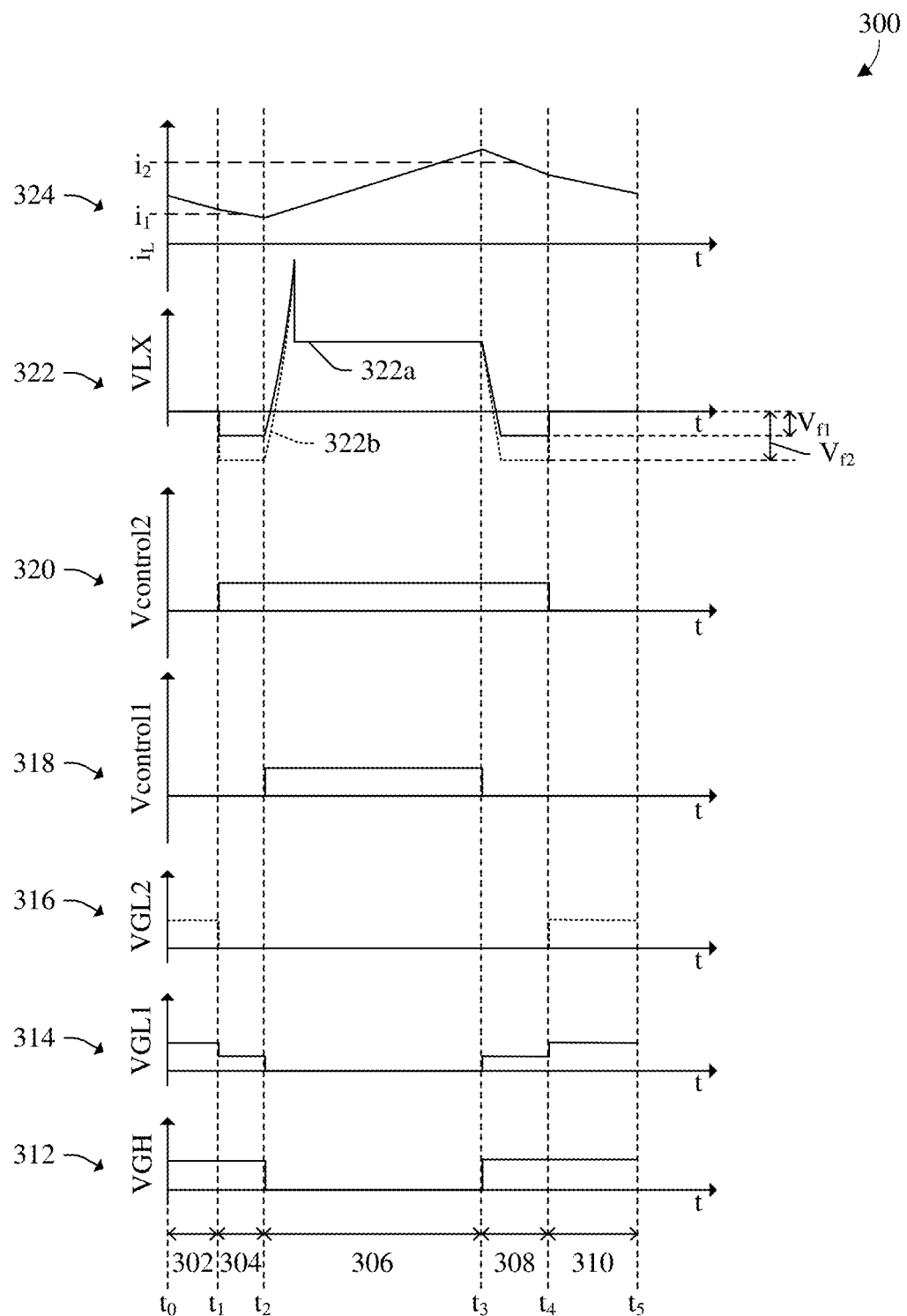
FIG. 3 illustrates a timing diagram of some embodiments of operation of the buck converter circuit comprising the conduction-loss reduction circuit from FIG. 1A, 1B, or 2.

With reference to FIG. 3, a timing diagram 300 of some embodiments of operating the buck converter circuit from FIGS. 1A, 1B, and 2. The timing diagram 300 provides one example of operating conditions applied to the buck converter circuit. However, it should be appreciated that other operating conditions amenable, whereby the timing diagram 300 is merely an example. A first pulse wave graph 312 illustrates the second pulse wave VGH (126 of FIG. 1A). A second pulse wave graph 314 illustrates the stepped pulse wave VGL1 (VGL or 132 of FIG. 1A). A third pulse wave graph 316 illustrates an additional embodiment of the first pulse wave VGL2 (e.g., 122 of FIG. 1A). The third pulse wave graph 316 illustrates the first pulse wave VGL2 (122 of FIG. 1A) applied to a gate of the first switching device (102 of FIG. 1A) of a buck converter without the conduction-loss reduction circuit (130 of FIG. 1A), where the first switching device (102 of FIG. 1A) remains OFF during a dead-time period. A first control signal graph 318 illustrates the first control signal Vcontrol1. A second control signal graph 320 illustrates the second control signal Vcontrol2. An inductor current graph 324 illustrates a current $i_L$ across the inductor (112 of FIG. 1A).

A first node voltage graph 322 illustrates voltage values at the first node VLX (106 of FIG. 1A) during operation conditions of the buck converter circuit. The first node voltage graph 322 illustrates a first voltage line 322a corresponding to the voltage at the first node VLX (106 of FIG. 1A) due to the stepped pulse wave VGL1. A second voltage line 322b corresponds to an additional embodiment of the voltage at the first node VLX (106 of FIG. 1A) due to the first pulse wave VGL2. A first forward bias Vf1 is applied across the first intrinsic body diode (102a of FIG. 1A) during a dead-time period associated with the stepped pulse wave VGL1. A second forward bias Vf2 is applied across the first intrinsic body diode (102a of FIG. 1A) of a buck converter without the conduction-loss reduction circuit (130 of FIG. 1A) during the dead-time period associated with the first pulse wave VGL2. The first forward bias Vf1 is less than the second forward bias Vf2. In some embodiments, the first forward bias Vf1 is approximately 50 percent less than the second forward bias Vf2. The reduction of the second forward bias Vf2 to the first forward bias Vf1 has the effect of reducing conduction power loss. In some embodiments, the first forward bias Vf1 is within a range of approximately −0.3 volts to approximately −0.9 volts. In some embodiments, the second forward bias Vf2 is within a range of approximately −0.7 volts to approximately −1.9 volts.

During each time frame outlined below, the conduction-loss reduction circuit (130 of FIG. 1A) processes the first and second control signals Vcontrol1, Vcontrol2 to determine if they will result in the first and second switching devices 102, 108 being OFF, resulting in the dead-time period. If the conduction-loss reduction circuit (130 of FIG. 1A) determines the dead-time period will occur, the conduction-loss reduction circuit (130 of FIG. 1A) will bias the gate of the first switching device 102, augmenting the first pulse wave (122 of FIG. 1A) into the stepped pulse wave VGL1 (e.g., 132 of FIG. 1A), turning the first switching device 102 partially ON.

During a first time frame 302, between an initial time to and immediately before a first time $t_1$, the first control signal Vcontrol1 is low (e.g., OFF) and the second control signal Vcontrol2 is low. VGH is high (e.g., ON), therefore the second switching device (108 of FIG. 1A) is OFF. VGL1 is high, therefore the first switching device (102 of FIG. 1A) is ON. The voltage at the first node VLX (106 of FIG. 1A) is at a first constant value and the inductor (112 of FIG. 1A) is discharging. In some embodiments, the first constant value is approximately 0 volts.

At the first time $t_1$, the second control voltage Vcontrol2 goes high. During a second time frame 304, between the first time $t_1$ and immediately before a second time $t_2$, the first and second control signals Vcontrol1, Vcontrol2 are respectively low and high, resulting in a first dead-time period. Therefore, the conduction-loss reduction circuit (130 of FIG. 1A) detects the first dead-time period and biases the gate of the first switching device (102 of FIG. 1A) with a voltage less than the threshold voltage of the first switching device (102 of FIG. 1A). In some embodiments, the threshold voltage of the first switching device (102 of FIG. 1A) is approximately 1.2 volts. In some embodiments, the gate of the first switching device (102 of FIG. 1A) is biased with a voltage of approximately 0.8 volts. Therefore, the device is partially ON and the third power supply 260 will not short to the reference node 104. Thus, VGL1 is partially high and the first switching device (102 of FIG. 1A) is partially ON. The voltage at the first node VLX (106 of FIG. 1A) is at a second constant value and the inductor (112 of FIG. 1A) is discharging. In some embodiments, the second constant value is negative and/or less than the first constant value. A first average current $i_1$ conducts across the inductor (112 of FIG. 1A) during the first dead-time period. A first dead-time conduction loss $P_1$ is equal to $P_1=V_{f1}*i_1$.

At the second time $t_2$, the first control voltage Vcontrol1 goes high. During a third time frame 306, between the second time $t_2$ and immediately before a third time $t_3$, the first and second control signals Vcontrol1, Vcontrol2 are high. VGH is low, therefore the second switching device (108 of FIG. 1A) is ON. VGL1 is low, therefore the first switching device (102 of FIG. 1A) is OFF. The voltage at the first node VLX (106 of FIG. 1A) spikes at a beginning of the third time frame 306 and settles to a constant value for a remainder of the third time frame 306. The inductor (112 of FIG. 1A) is charging in the third time frame 306. The voltage at the first node VLX during the third time frame 306 is greater than the first forward bias $V_{f1}$.

At the third time $t_3$, the first control voltage Vcontrol1 goes low. During a fourth time frame 308, between the third time $t_3$ and immediately before a fourth time $t_4$, the first and second control signals Vcontrol1, Vcontrol2 are low and high, respectively, resulting in a second dead-time period. Therefore, the conduction-loss reduction circuit (130 of FIG. 1A) detects the second dead-time period and biases the gate of the first switching device (102 of FIG. 1A) with a voltage less than the threshold voltage of the first switching device (102 of FIG. 1A). Thus, VGL1 is partially high and the first switching device (102 of FIG. 1A) is partially ON. VGH is high, therefore the second switching device (108 of FIG. 1A) is OFF. During an initial time of the fourth time frame 308, the voltage at the first node VLX (106 of FIG. 1A) decreases to the second constant value and the inductor (112 of FIG. 1A) is discharging. In some embodiments, the second constant value is negative and/or less than the first constant value. A second average current $i_2$ conducts across the inductor (112 of FIG. 1A) during the second dead-time period. A second dead-time conduction loss $P_2$ is equal to $P_2=V_{f1}*i_2$.

At the fourth time $t_4$, the second control voltage Vcontrol2 goes low. During a fifth time frame 310, between the fourth time $t_4$ and immediately before a fifth time $t_5$, the first and second control signals Vcontrol1, Vcontrol2 are low. VGH is high, therefore the second switching device (108 of FIG. 1A) is OFF. VGL1 is high, therefore the first switching device (102 of FIG. 1A) is ON. The voltage at the first node VLX (106 of FIG. 1A) is at the first constant value and the inductor (112 of FIG. 1A) is discharging.

Figure 4:
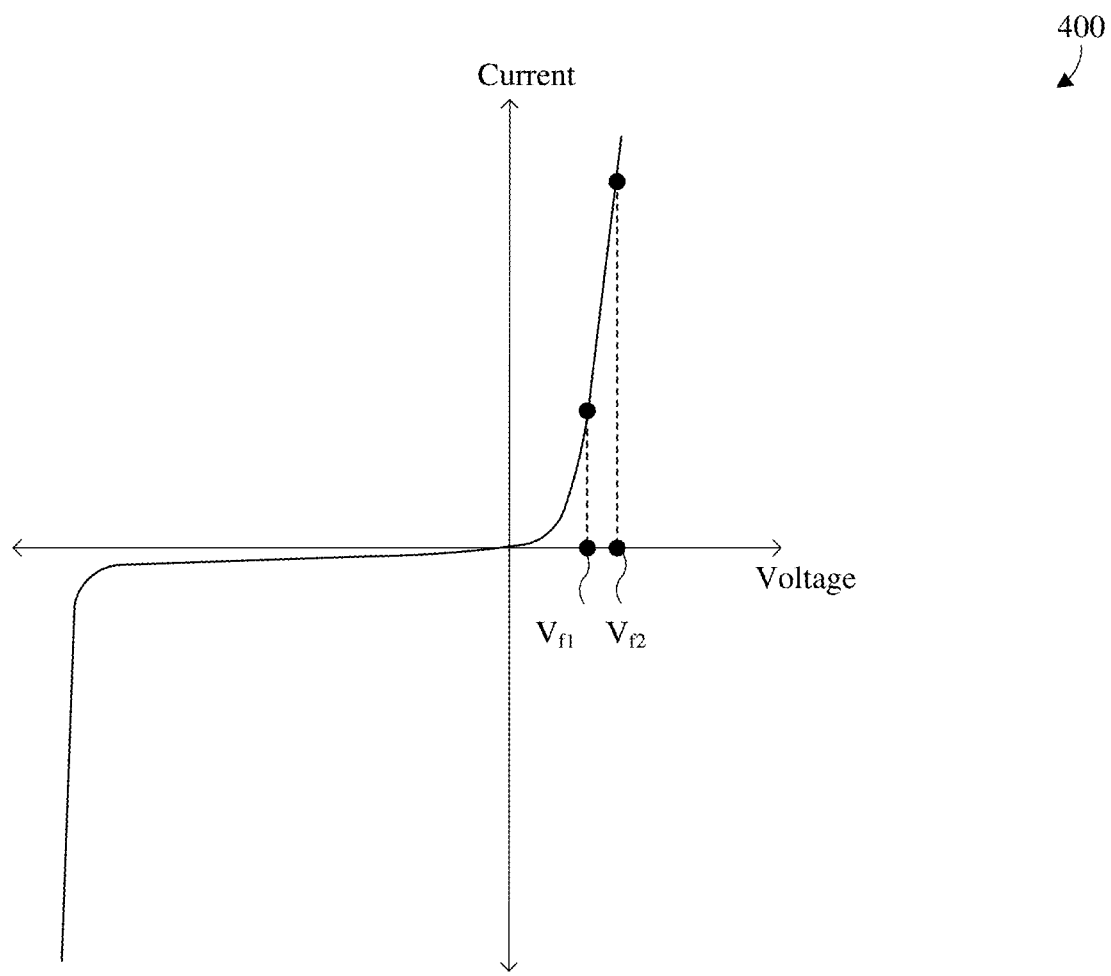
FIG. 4 illustrates a graph which sets forth Current-Voltage (IV) characteristics for some embodiments of an intrinsic diode within a first switching device of the buck converter circuit, according to the present disclosure.

FIG. 4 illustrates an IV curve 400 of embodiments of an intrinsic diode within a first switching device of the buck converter circuit comprising the conduction-loss reduction circuit, such as previously illustrated and described in FIG. 1A. The IV curve 400 reflects operating characteristics of the first intrinsic body diode (102a of FIG. 1A). While applying the first forward bias $V_{f1}$, a first forward current across the first intrinsic body diode (102a of FIG. 1A) is less than a second forward current while applying the second forward bias $V_{f2}$. Thus, reducing the second forward bias $V_{f2}$ to the first forward bias $V_{f1}$ reduces the power loss across first intrinsic body diode (102a of FIG. 1A) during a dead-time period of the buck converter with the conduction-loss reduction circuit.

Figure 5:
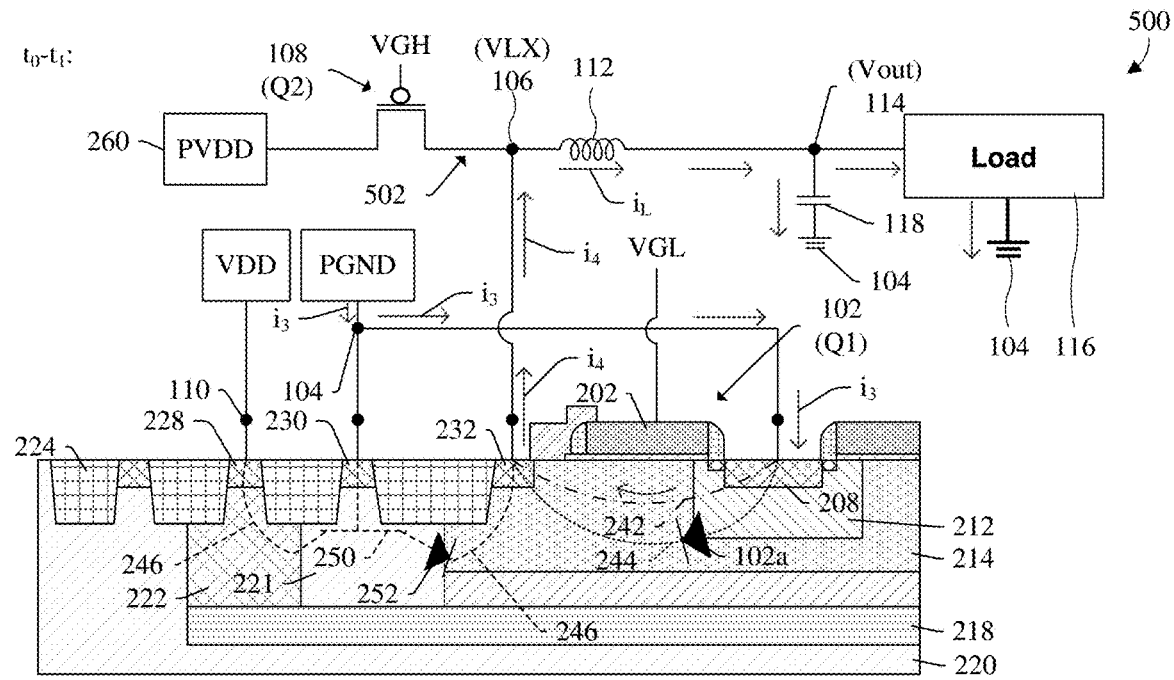
FIGS. 5-9 illustrate circuit diagrams of the buck converter circuit of FIG. 2 at various states using non-limiting example voltages and currents.
Figure 6:
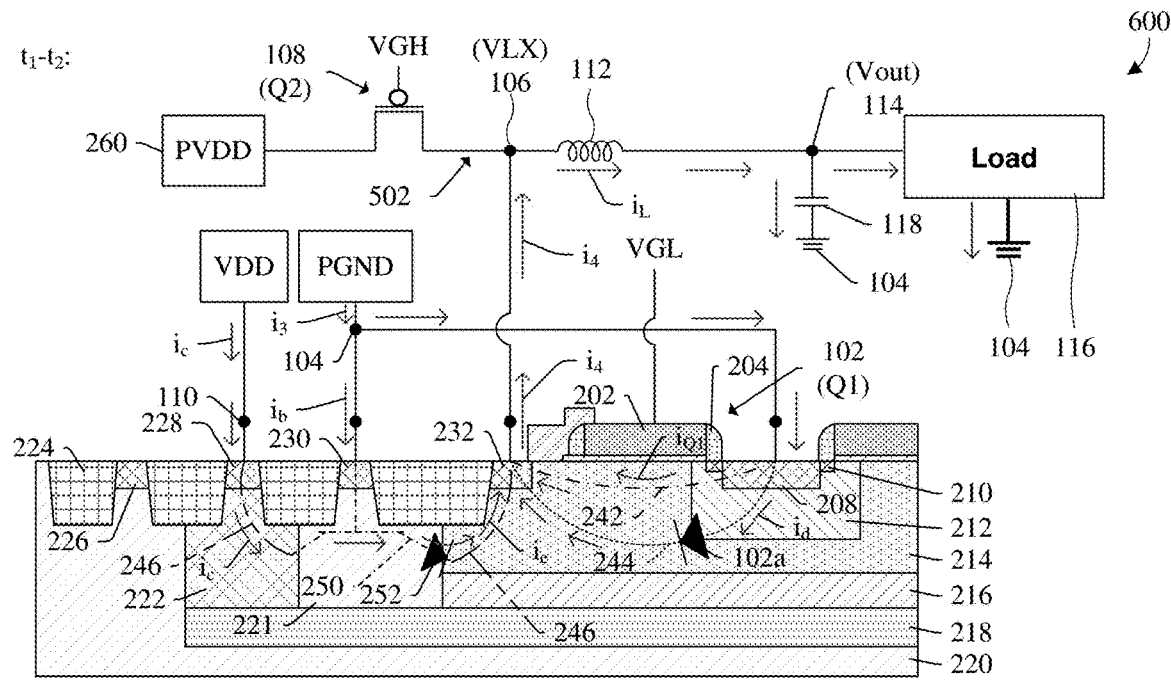
Figure 7:
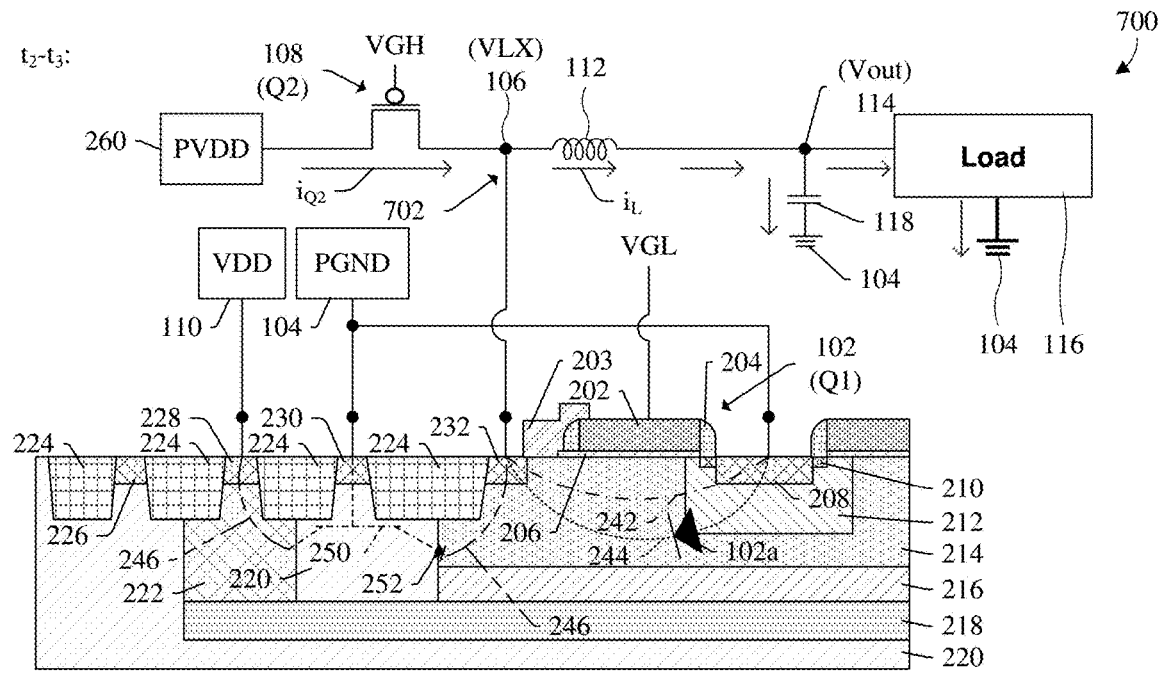
Figure 8:
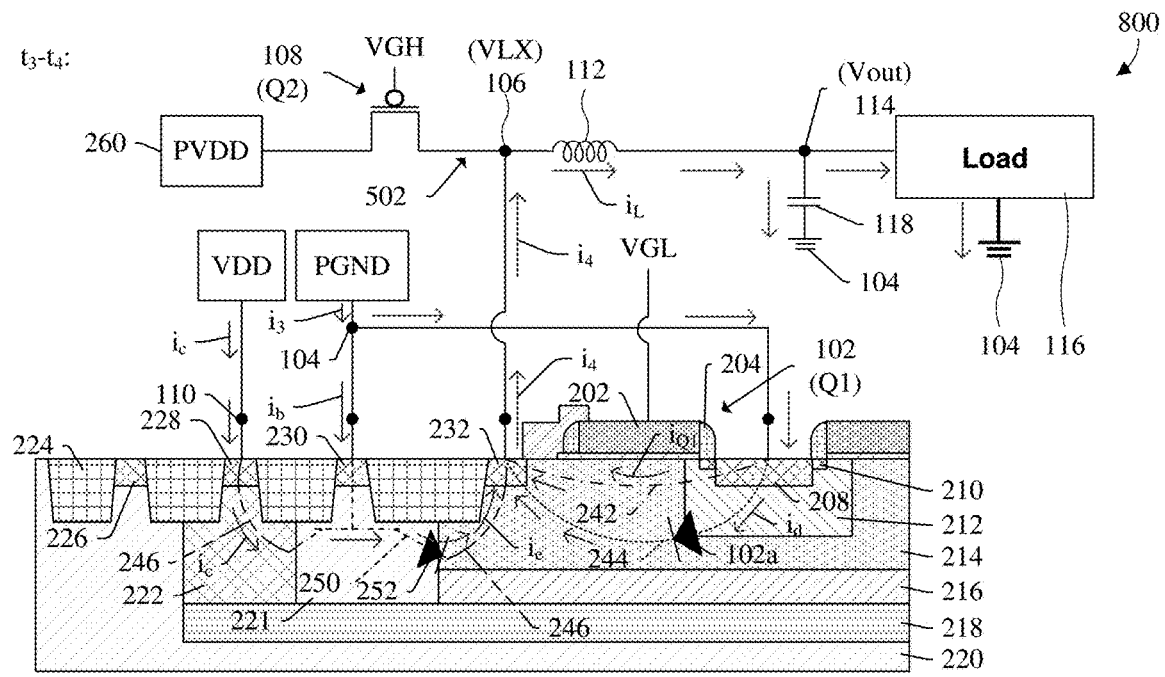
Figure 9:
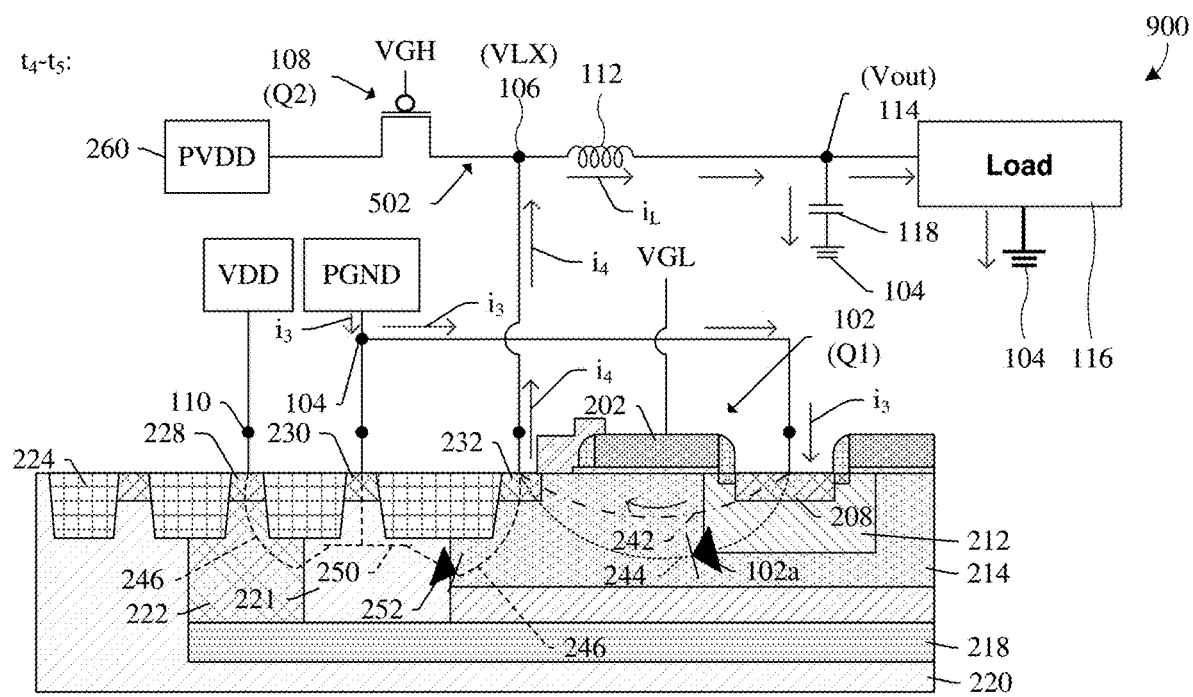

With reference to FIGS. 5-9, circuit diagrams 500-900 of some embodiments of the buck converter circuit of FIG. 2 at various states are provided using non-limiting example voltages and currents. FIG. 5 illustrates currents flowing in the buck converter circuit in a first discharging state according to the first time frame 302 of the timing diagram 300 of FIG. 3. FIG. 6 illustrates currents flowing in the buck converter circuit during the first dead-time period according to the second time frame 304 of the timing diagram 300 of FIG. 3. FIG. 7 illustrates currents flowing in the buck converter circuit in a charging state according to the third time frame 306 of the timing diagram 300 of FIG. 3. FIG. 8 illustrates currents flowing in the buck converter circuit during the second dead-time period according to the fourth time frame 308 of the timing diagram 300 of FIG. 3. FIG. 9 illustrates currents flowing in the buck converter circuit during a second discharging state according to the fifth time frame 310 of the timing diagram 300 of FIG. 3.

With specific reference to the circuit diagram 500 of FIG. 5, the second switching device 108 is OFF and therefore current does not flow between the third power supply 260 and the first node 106, effectively causing an open circuit at a first location 502. The inductor current $i_L$ flows from the inductor 112 to the second node 114 and through the capacitor 118 and the load 116 to the reference node 104. The inductor 112 induces the current $i_L$ across the capacitor 118 and the load 116 to the reference node 104 causing a third current $i_3$ to flow from the reference node 104 to the second source/drain region 208. The third current $i_3$ flows through the third current path 242 producing a fourth current $i_4$ to flow from the first source/drain region 232 to the inductor 112.

With specific reference to the circuit diagram 600 of FIG. 6, the second switching device 108 is OFF and therefore current does not flow between the third power supply 260 and the first node 106, effectively causing an open circuit at the first location 502. The first switching device 102 is partially ON. In some embodiments, the power supply 110 is biased at about 20 volts, the reference node 104 is biased at about 0 volts, and the first node 106 is biased within a range of approximately −0.3 volts to approximately −0.9 volts. The inductor current $i_L$ flows from the inductor 112 to the second node 114 and through the capacitor 118 and the load 116 to the reference node 104. The inductor 112 induces the current $i_L$ across the capacitor 118 and the load 116 to the reference node 104 causing a third current $i_3$ to flow from the reference node 104 to the second source/drain region 208. A first switching current $i_{Q1}$ flows through the small conductive channel formed in the first switching device 102 through the third current path 242 to the first source/drain region 232. An intrinsic diode current $i_d$ flows through the first intrinsic body diode 102a through the second current path 244. A base current $i_b$ flows into the third contact region 230 through the NPN transistor 250 along the first current path 246 to the first source/drain region 232. A collector current $i_c$ flows into the second contact region 228 through the NPN transistor 250 along the first current path 246 to the first source/drain region 232. The base and collector currents $i_b$, $i_c$ combine into an emitter current $i_e$, where $i_e=i_b+i_c$. The first switching current $i_{Q1}$, intrinsic diode current $i_d$, and emitter current $i_e$ are in parallel with one another, therefore a fourth current $i_4$ is equal to a sum of the aforementioned currents, where $i_4=i_{Q1}+i_d+i_e$. The first dead-time conduction loss $P_1$ is equal to $P_1=V_{f1}*i_4$. In some embodiments, the fourth current $i_4$ within a range of approximately 1 milliamp and approximately 100 milliamps.

With specific reference to the circuit diagram 700 of FIG. 7, the second switching device 108 is ON and therefore a second switching current $i_{Q2}$ flows between the third power supply 260 and the first node 106, charging the inductor 112. The first switching device 102 is OFF and therefore current does not flow from the first source/drain region 232 to the first node 106, effectively causing an open circuit at a second location 702. The inductor current $i_L$ flows from the inductor 112 to the second node 114 and through the capacitor 118 and the load 116 to the reference node 104. In some embodiments, the third power supply 260 is at about 20 volts.

With specific reference to the circuit diagram 800 of FIG. 8, the second switching device 108 is OFF and therefore current does not flow between the third power supply 260 and the first node 106, effectively causing an open circuit at the first location 502. The first switching device 102 is partially ON. In some embodiments, the power supply 110 is at about 20 volts, the reference node 104 is at about 0 volts, and the first node 106 is within a range of approximately −0.3 volts to approximately −0.9 volts. The inductor current $i_L$ flows from the inductor 112 to the second node 114 and through the capacitor 118 and the load 116 to the reference node 104. The inductor 112 induces the current $i_L$ across the capacitor 118 and the load 116 to the reference node 104 causing a third current $i_3$ to flow from the reference node 104 to the second source/drain region 208. A first switching current $i_{Q1}$ flows through the small conductive channel formed in the first switching device 102 through the third current path 242 to the first source/drain region 232. An intrinsic diode current $i_d$ flows through the first intrinsic body diode 102a through the second current path 244. A base current $i_b$ flows into the third contact region 230 through the NPN transistor 250 along the first current path 246 to the first source/drain region 232. A collector current $i_c$ flows into the second contact region 228 through the NPN transistor 250 along the first current path 246 to the first source/drain region 232. The base and collector currents $i_b$, $i_c$ combine into an emitter current $i_e$, where $i_e=i_b+i_c$. The first switching current $i_{Q1}$, intrinsic diode current $i_d$, and emitter current $i_e$ are in parallel with one another, therefore a fourth current $i_4$ is equal to a sum of the aforementioned currents, where $i_4=i_{Q1}+i_d+i_e$. The second dead-time conduction loss $P_2$ is equal to $P_2=V_{f1}*i_4$. In some embodiments, the fourth current $i_4$ within a range of approximately 1 milliamp and approximately 100 milliamps.

With specific reference to the circuit diagram 900 of FIG. 9, the second switching device 108 is OFF and therefore current does not flow between the third power supply 260 and the first node 106, effectively causing an open circuit at the first location 502. The inductor current $i_L$ flows from the inductor 112 to the second node 114 and through the capacitor 118 and the load 116 to the reference node 104. The inductor 112 induces the current $i_L$ across the capacitor 118 and the load 116 to the reference node 104 causing a third current $i_3$ to flow from the reference node 104 to the second source/drain region 208. The third current $i_3$ flows through the third current path 242 producing the fourth current $i_4$ to flow from the first source/drain region 232 to the inductor 112.

Figure 10:
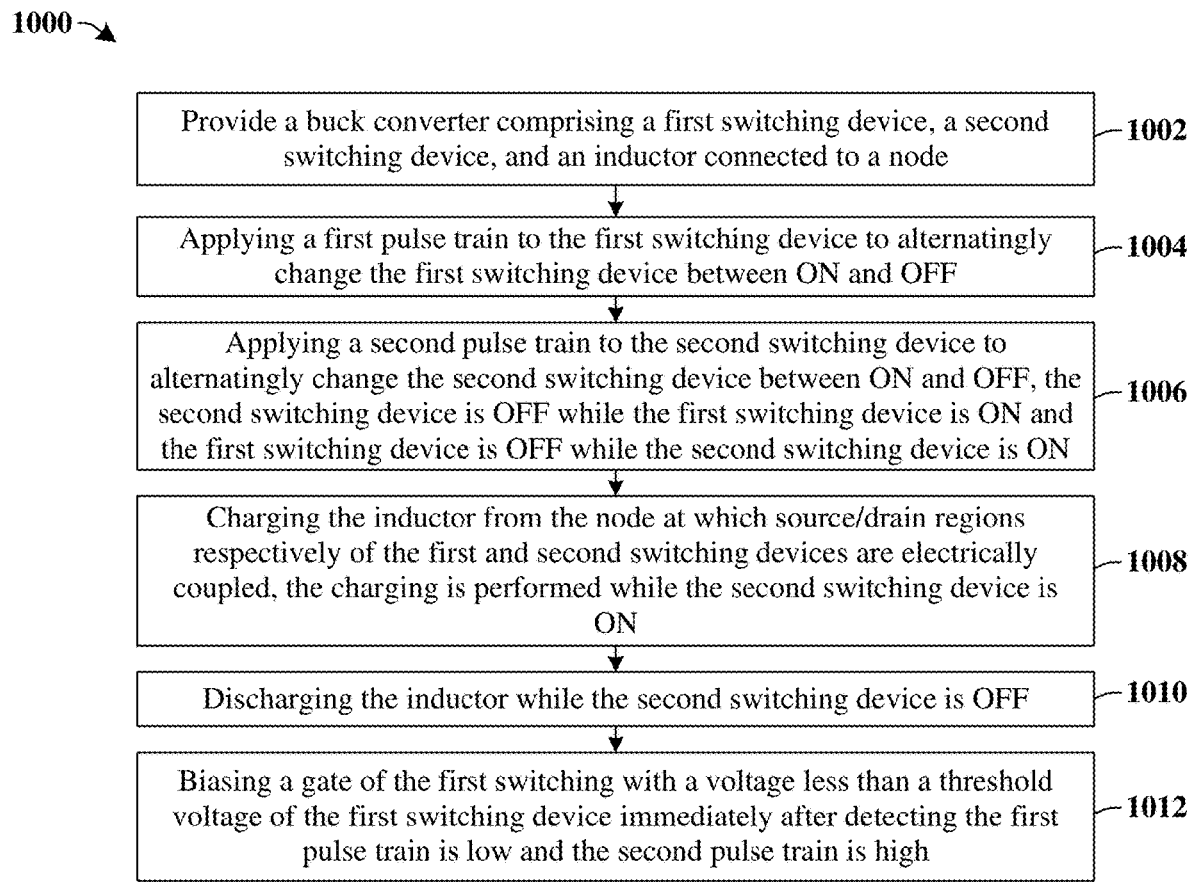
FIG. 10 illustrates a block diagram of some embodiments of a method of using a buck converter circuit comprising a conduction-loss reduction circuit.

With reference to FIG. 10, a block diagram 1000 of some embodiments of a method of using the buck converter of FIG. 1A is provided.

At 1002, a buck converter comprising a first switching device, a second switching device, and an inductor is provided and the aforementioned components are connected to a node. FIG. 1A illustrates a circuit 100a corresponding to some embodiments of act 1002.

At 1004, a first pulse train is applied to the first switching device to alternating change the first switching device between ON and OFF. FIGS. 5-9 illustrate circuits 500-900 corresponding to some embodiments of act 1004.

At 1006, a second pulse train is applied to the second switching device to alternating change the second switching device between ON and OFF, the second switching device is OFF while the first switching device is ON and the first switching device is OFF while the second switching device is ON. FIGS. 5-9 illustrate circuits 500-900 corresponding to some embodiments of act 1006.

At 1008, the inductor is charged from the node at which source/drain regions respectively of the first and second switching devices are electrically coupled, the charging is performed while the second switching device is ON. FIG. 7 illustrates a circuit 700 corresponding to some embodiments of act 1008.

At 1010, the inductor is discharged while the second switching device is OFF. FIGS. 5, 6, 8, and 9 illustrate circuits 500, 600, 800, and 900 corresponding to some embodiments of act 1010.

At 1012, a gate of the first switching device is biased with a voltage less than a threshold voltage of the first switching device immediately after detecting the first pulse train is low and the second pulse train is high. FIGS. 6 and 8 illustrate circuits 600 and 800 corresponding to some embodiments of act 1012.

While the block diagram 1000 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

Accordingly, in some embodiments, the present application relates to a buck converter comprising a loss-prevention circuit configured to bias a switching device of the buck converter with a voltage less than a threshold of the switching device during a dead-time period.

In some embodiments, the present application provides an integrated circuit (IC) including: a first switching device; a second switching device; an inductor electrically coupled to a first source/drain region of the first switching device and a first source/drain region of the second switching device at a node; and a controller configured to alternatingly change the first and second switching devices between a first state and a second state, respectively, wherein the first switching device is in a third state before or after the second switching device transitions between the first and second states, wherein a subthreshold voltage is applied to a first gate of the first switching device during the third state, such that the third state is between a cutoff mode and a triode mode of the first switching device.

In some embodiments, the present application provides an integrated chip including: a first transistor; a second transistor; an inductor coupled to the first and second transistors at a node; a controller configured to alternatingly change the first and second transistors between a first state and a second state, respectively; and a conduction-loss reduction circuit electrically coupled to the gate terminals of the first and second transistors and configured to bias the gate terminal of the first transistor with a subthreshold voltage less than a threshold voltage of the first transistor while transitioning between the first and second states, wherein the conduction-loss reduction circuit includes a third transistor electrically coupled to ground and the gate terminal of the first transistor.

In some embodiments, the present application provides a method for operating an IC including: applying a first pulse train and a second pulse train respectively to a first transistor and a second transistor to alternatingly change the first and second transistors between a first state and a second state, wherein the first transistor is ON and the second transistor is OFF at the first state, and wherein the first transistor is OFF and the second transistor is ON at the second state; charging an inductor during the second state from a node at which source/drain regions respectively of the first and second transistors are electrically coupled; and biasing a gate of the first transistor with a subthreshold voltage immediately after detecting the first pulse train is low and the second pulse train is high such that the first transistor is in a subthreshold mode, wherein the first transistor is between ON and OFF during the subthreshold mode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit (IC) comprising:
a first switching device;
a second switching device;
an inductor electrically coupled to a first source/drain region of the first switching device and a first source/drain region of the second switching device at a node; and
a controller configured to alternatingly change the first and second switching devices between a first state and a second state, respectively, wherein the first switching device is in a third state before or after the second switching device transitions between the first and second states, wherein a subthreshold voltage is applied to a first gate of the first switching device during the third state, such that the third state is between a cutoff mode and a triode mode of the first switching device;
wherein the first switching device comprises a second source/drain region, wherein the first and second source/drain regions of the first switching device are disposed within a substrate on opposite sides of the first gate, wherein during the third state a conductive channel is disposed in the substrate laterally between the first and second source/drain regions of the first switching device and directly below the first gate.

2. The IC according to claim 1, wherein the subthreshold voltage is non-zero.

3. The IC according to claim 1, wherein the subthreshold voltage is less than a threshold voltage of the first switching device, wherein biasing the first gate with the threshold voltage places the first switching device in the triode mode.

4. The IC according to claim 1, wherein the first gate is biased with a threshold voltage while in the first state, and wherein an absolute value of the subthreshold voltage is greater than or equal to a quarter of an absolute value of the threshold voltage.

5. The IC according to claim 1, wherein the first switching device is in the third state immediately before the second switching device transitions from the second state to the first state.

6. The IC according to claim 1, wherein the subthreshold voltage is greater than a voltage applied to the first gate during the second state and is less than a voltage applied to the first gate during the first state.

7. An integrated chip comprising:
a first transistor;
a second transistor;
an inductor coupled to the first and second transistors at a node;
a controller configured to alternatingly change the first and second transistors between a first state and a second state, respectively; and
a conduction-loss reduction circuit directly electrically coupled to gate terminals of the first and second transistors and configured to bias the gate terminal of the first transistor with a subthreshold voltage less than a threshold voltage of the first transistor while transitioning between the first and second states, wherein the conduction-loss reduction circuit comprises a third transistor directly electrically coupled to ground and directly electrically coupled to the gate terminal of the first transistor.

8. The integrated chip according to claim 7, wherein the subthreshold voltage is non-zero.

9. The integrated chip according to claim 7, wherein the conduction-loss reduction circuit further comprises:
a level shifter electrically coupled from the gate terminal of the second transistor to a gate terminal of the third transistor.

10. The integrated chip according to claim 7, wherein the conduction-loss reduction circuit further comprises:
a fourth transistor electrically coupled to a power supply rail and the gate terminal of the first transistor.

11. The integrated chip according to claim 10, wherein the third transistor is an n-channel metal-oxide-semiconductor (MOS) transistor and the fourth transistor is a p-channel MOS transistor.

12. The integrated chip according to claim 7, wherein while biasing the gate terminal of the first transistor with the subthreshold voltage the integrated chip comprises:
a first current path between a power supply rail and the node;
a second current path between a first source/drain region of the first transistor and the node, wherein the second current path conducts through an internal diode of the first transistor; and
a third current path between the first source/drain region and a second source/drain region of the first transistor, wherein the first and second source/drain regions are disposed within a substrate on opposing sides of a gate structure of the first transistor, wherein the third current path conducts within the substrate in a region laterally between the first and second source/drain regions and directly beneath the gate structure.

13. The integrated chip according to claim 12, wherein the third and second current paths are in parallel.

14. The integrated chip according to claim 7, wherein the subthreshold voltage is greater than or equal to a tenth of the threshold voltage.

15. A method comprising:
applying a first pulse train and a second pulse train respectively to a first transistor and a second transistor to alternatingly change the first and second transistors between a first state and a second state, wherein the first transistor is ON and the second transistor is OFF at the first state, and wherein the first transistor is OFF and the second transistor is ON at the second state;
charging an inductor during the second state from a node at which source/drain regions respectively of the first and second transistors are electrically coupled; and
biasing a gate of the first transistor with a subthreshold voltage immediately after detecting the first pulse train is low and the second pulse train is high such that the first transistor is in a subthreshold mode, wherein the first transistor is between ON and OFF during the subthreshold mode, wherein while biasing the gate of the first transistor with the subthreshold voltage a first current path conducts through an internal diode of the first transistor and a second current path conducts between a pair of source/drain regions of the first transistor.

16. The method according to claim 15, wherein the first pulse train is between low and high while biasing the gate of the first transistor with the subthreshold voltage.

17. The method according to claim 15, wherein the subthreshold voltage is less than a threshold voltage of the first transistor and is non-zero.

18. The method according to claim 15, further comprising:
discharging the inductor while the second transistor is OFF.

19. The method according to claim 15, wherein a frequency of the first and second pulse trains are equal, wherein the second pulse train has a duty cycle greater than the first pulse train, and wherein the second pulse train has a phase offset relative to the first pulse train.

20. The method according to claim 15, wherein the second current path is directly below the gate of the first transistor.

* * * * *